April 19, 1966  R. E. LIDOV  3,247,279
HEAT CONTROL IN CATALYTIC OXIDATION PROCESS
Filed Feb. 12, 1962
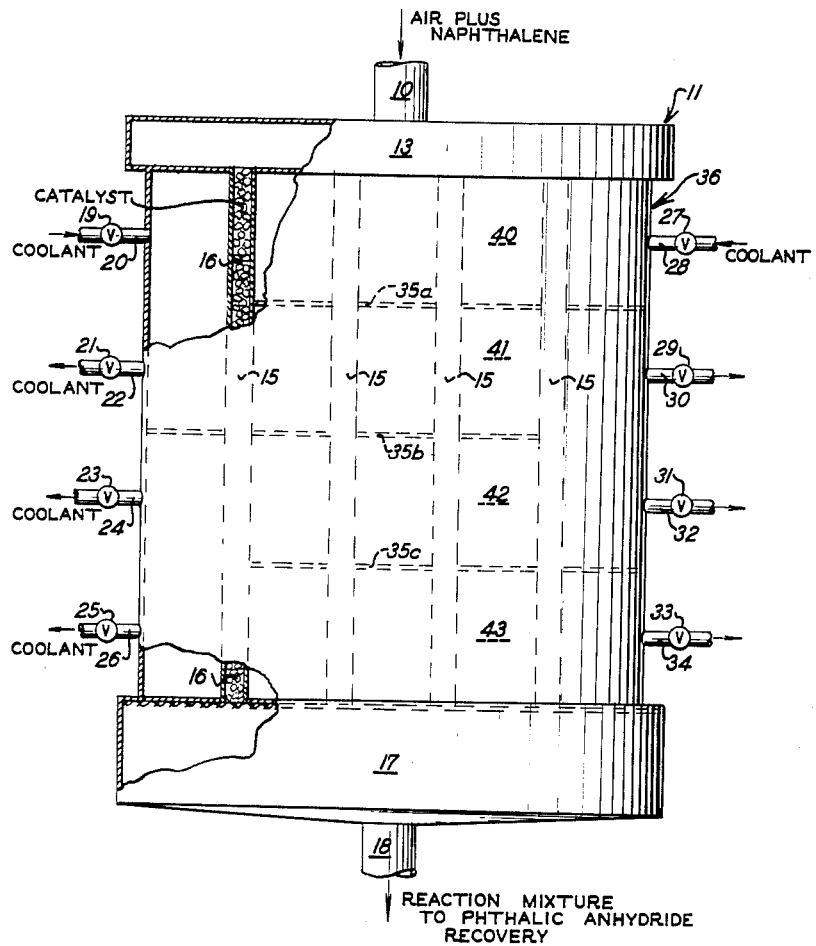
INVENTOR
REX E. LIDOV
BY William C. Long
ATTORNEY United States Patent Office 3,247,279
Patented Apr. 19, 1966

3,247,279
HEAT CONTROL IN CATALYTIC
OXIDATION PROCESS
Rex E. Lidov, Great Neck, N.Y., assignor to Halcon
International, Inc., a corporation of Delaware
Filed Feb. 12, 1962, Ser. No. 172,719
1 Claim. (Cl. 260—687)

This invention relates to processes and apparatus for the catalytic vapor phase partial oxidation of an organic material followed by recovery of one or more desired products from the reaction mixture, more particularly to such processes and apparatus wherein the reaction is carried out in an elongated catalytic reaction zone maintained under temperature control by a flow of coolant which removes heat indirectly from the gaseous reaction mixture, and especially, to such a process carried out in a vertical tube and shell type reactor provided with a series of horizontal baffles dividing the coolant region thereof into a series of horizontal sections each of which (sections) is provided with its own inlet and outlet means and wherein the rate of coolant flow into or from each section is regulated so as to control the desired temperature gradient across the reactor.

Many processes for the catalytic vapor phase partial oxidation of organic materials are known and many of these are carried out in elongated tubular reactors arranged in a tube and shell heat exchanger system so that the heat of reaction may be removed. In many of these, the oxidation reaction produces a relatively localized very high temperature zone from which heat must be removed at a very rapid rate if temperature control is to be maintained. This very high temperature zone is caused by the fact that much of the desired oxidation reaction takes place at a very rapid rate in or over a very short portion of the reactor tube length. Failure to control reaction temperature in this high temperature zone leads to loss through complete destruction of the organic material by over-oxidation. Accordingly, it is necessary to circulate coolant very rapidly and at a suitably low relative temperature to remove the heat through the limited tube surface area available in the zone of rapid reaction. In consequence, the greater length of reaction tube which follows the above described "hot-spot" zone is cooled excessively. The relatively slow oxidation reaction which continues as the reactants move through the tube cannot supply heat sufficiently rapidly to maintain, in the remainder of the reactor, as high a temperature as is desirable efficiently to complete the partial oxidation. As a result, yields suffer. The problems posed by the somewhat contradictory coolant requirements of the "hot-spot" zone of the reactor and the remainder of the reactor can, of course, be solved by separating these zones and using a multi-reactor system, thus providing each reactor section with coolant at that temperature and in such amount as is best suited to it. While theoretically, this is an ideal system, practically, it is uneconomic; the increase in product yield obtained does not justify the very large expenditures required to provide and operate a multiplicity of reactors and coolant circulation systems. The art requires some resolution of the described difficulties within the framework of the commercially useful single reactor system dictated by chemical process economics.

The discoveries associated with the invention and relating to the solution of the above problems, and the objects achieved in accordance with the invention as set forth herein include the provision of:

A process for the catalytic partial oxidation of an organic vapor in an elongated catalytic reaction system in which the circulation of a heat-transfer fluid is maintained through the length of a reactor for the control of reaction temperature, including the improvement of changing the volume of the fluid circulating from point to point by adding and removing such fluid to and from the reactor at intermediate points in order thereby to control the temperature of various parts of the reactor along its length independently of variations in heat flow produced by the reaction occurring along the length of the reactor;

Such a process having a hot spot and having the reaction zone maintained at a gradually decreasing temperature gradiant beyond the hot spot in the direction of flow of the reaction mixture, whereby improved conversion is obtained;

Such a process wherein the temperature gradiant is stepwise;

Such a process wherein the organic starting material is phthalic anhydride percursor;

Such a process wherein naphthalene is oxidized by atmospheric air at a series of temperatures in the range of 350° to 550 C.

Such a process wherein o-xylene is oxidized by atmospheric air at a series of temperatures in the range of 800° to 1200° F.;

Such a process wherein the temperature gradiant is maintained by controlling the rate of heat removal along the reaction zone;

Such a process wherein the control of heat removal is by regulation of the flow of coolant medium along spaced sections of the zone;

Such a process wherein naphthalene is oxidized by atmospheric air at a series of temperatures in the range of 350° to 550° C.;

Such a process wherein o-xylene is oxidized by atmospheric air at a series of temperatures in the range of 800° to 1200° F.;

Such a process in which heat transfer fluid is added to and removed from the reactor at various intermediate points, including the step of changing the temperature of the fluid so added from that of the bulk of the heat transfer fluid by means external to the reactor, before the fluid is added to the reactor;

Such a process for the catalytic partial oxidation of an organic vapor in an elongated catalytic reaction system, including the improvement of changing the volume of the circulating coolant, required to remove exothermic reaction heat, at various intermediate points along the length of the reactor, said changes being effected to insure maximum cooling in the zone of most rapid heat evolution and reduced cooling in zones of reduced heat release, in order to maintain and control reaction temperatures through the length of the reactor;

Such a process using a down-flowing reactant and a down-flowing coolant;

Such a process using a down-flowing reactant and an up-flowing coolant;

Such a process using an up-flowing reactant and an up-flowing coolant;

Such a process using an up-flowing reactant and a down-flowing coolant;

An apparatus adapted for use in the partial oxidation of an organic material including the combination of a feed inlet means, elongated reactor tube means, reaction product outlet means, spaced coolant means zones along the reactor tube means and surrounding the same each coolant means zone being provided with at least one inlet and at least one outlet means;

Such an apparatus in vertical cylindrical tube and shell form wherein the region between the tubes and the shell is divided into a plurality of cylindrical sections;

And other objects which will be apparent as details or embodiments of the invention are set forth hereinafter.

The accompanying drawing illustrates one embodiment of the invention, partially in elevation and partially in section.

In order to indicate still more fully the nature of the present invention, the following examples of typical procedures are set forth in which parts and percents means parts and percents by weights, respectively, unless otherwise indicated, it being understood that these examples are presented as illustrative only and they are not intended to limit the scope of the invention.

EXAMPLE 1

Referring to the accompanying drawing, a feed mixture of air and naphthalene is passed via inlet 10 into reactor 11. This reactor is provided with a header 13, reactor tubes 15 loaded with catalyst 16, outlet header 17 and reaction product outlet 18. In addition, the reactor is provided with a series of baffles 35a, 35b, and 35c, at right angles relative to the tubes which divide the region between the outer shell or wall 36 and the tubes into a series of sections, 40, 41, 42 and 43. Each of the sections is provided with one or more coolant inlet or outlet means 20, 22, 24 and 26, 28, 30, 32 and 34 provided with valves 19, 21, 23, and 25, 27, 29, 31, and 33 respectively. The reactor tube is provided with a suitable known catalyst loaded in usual manner, and the tubes may be provided with known temperature sensors (thermocouples) arranged therealong or therein in known manner (not shown).

The flow of coolant which, in this case, is molten salt is regulated so as to control temperature in the "hot-spot" zone and, at the same time to maintain as high a temperature in the remainder of the reactor as is desirable. The feed to the reactor contains one part by weight of naphthalene to about thirty parts by weight of air; it is preheated to about 250° to 350° C., i.e., to just below reaction temperature, in known manner. Under these circumstances, a hot-spot develops at about the junction between section 40 and section 41. The minimum coolant temperature permissible is about 250° to 350° C., again, about the minimum reaction temperature. A coolant any colder than this temperature will cool incoming gases below reaction temperature and no reaction will occur. Thus, in order to control the hot-spot or "hot-zone" temperature, coolant at this minimum temperature is introduced through line 28 and valve 27. If the hot-zone temperature is to be adequately controlled, the amount of coolant introduced must be such that its temperature rise, as it passes through the hot zone, is not more than a few degrees. All of the coolant is introduced through line 28 and valve 27 because the fluid, at initiating reaction temperature, is an economical means for bringing the reaction gas to that temperature. Under these conditions, the hot-spot zone can be maintained in the range of about 550° to 600° C. without undue difficulty. Valve 19 is kept closed. However, valve 29 is opened to such an extent that approximately 90 to 95% of the molten salt entering through line 28 is discharged from the reactor through line 30. By discharging most of the coolant in this fashion it is possible to hold reaction temperatures in zone 42 appreciably above the temperature of the coolant entering that section past baffle 35b. The remainder of the coolant is finally discharged through valve 33 and line 34. The reaction mixture is processed in leaving the reactor, in known manner to recover both phthalic anhydride and maleic anhydride. There is thus obtained a very high yield of crude phthalic anhydride of exceptional purity.

The feed may contain 1 part by weight of naphthalene to about 30 parts by weight of air and it may be preheated to about 250° to 350° C., i.e., to just below reaction temperature in known manner. The catalyst bed is raised to initial reaction temperature in known manner and then after the zone of initial high temperature exotherm is passed, maintained at a gradually decreasing reaction temperature down to about 350° C. at or near the reactor outlet. The reaction is exothermic and the flow conditions are maintained so that the most rapid reaction is in the initial part or section of the reactor tube, and the more rapid flow of coolant is maintained in this section of the reactor.

Generally a plurality of reaction tubes is used, and a known vanadium oxide type catalyst provided with a suitable support may be used. Although four reaction zones or sections are shown, arranged for an optional zig-zag flow, a larger or a smaller number may be used if desired as may different flow paths. A plurality of inlets or outlets or coolant lines for each zone may be used and these may be spaced in any convenient manner. In addition, vertical or other baffle means may be used more evently to distribute the flow of coolant through or across each section or zone.

If desired, the horizontal baffles which separate the zones may be provided with perforations for upward or downward flow of coolant from one zone to the other in order to help smoothen out the temperature gradient.

A loose fit between the tubes and the horizontal baffles permits such downward or upward flow, also with suitable regulation of the inlet and outlet valves.

Instead of naphthalene, other known phthalic anhydride precursors may be used, such as substituted naphthalene and the like, and similar results are obtained therewith.

*Comparative example A*

The above example is repeated except that the coolant is caused to flow through the reactor in the fashion now used by the art when employing single reactors with co-current flow of the circulating heat abstracting medium. This is accomplished by introducing all of the coolant, as in Example 1, in the same amount and at the same temperature, through valve 27 and line 28. However, in this case, valves 21, 23, 25, 29, and 31 are kept tightly closed and no coolant leaves the reactor at intermediate points. Instead the entire flow is discharged through valve 33 and line 34. As a result, the reaction temperature drops sharply immediately the hot zone at the junction of sections 40 and 41 is past, and only that very limited amount of oxidation which could take place at about the relatively low temperature of the coolant continues outside of the hot zone.

The yield of crude phthalic anhydride recovered is not only lower than in the case described in Example 1, but, in addition the anhydride is less pure. It is contaminated with large amounts of dark tarry substances and other impurities compared to the material recovered in Example 1 and is in consequence, much more difficult to refine. These tarry substances and other impurities are present in and contaminate the product because the lower temperature obtaining in the reactor tubes in the reactor operated in accordance with current art practice prevents conversion of these materials to useful products or their removal by complete oxidation.

EXAMPLE 2

The Example 1 procedure is repeated except that the feed is benzene with air and the reaction system is arranged in known manner for the production of maleic anhydride and analogue improvements in the yield and quality are obtained.

EXAMPLE 3

The procedure of Example 1 is repeated except that o-xylene is converted to phthalic anhydride at temperatures in the range of 800° to 1200° F., and analogous improvements in the yield and quality are obtained.

EXAMPLE 4

The process of Example 1 is repeated with two essential modifications; the oxidizable organic material employed is durene (1, 2, 4, 5-tetramethylbenzene) rather than naphthalene and the coolant flow is further modified. As already described, the volume of coolant entering the reactor through valve 27 is regulated to maintain the hot-zone at the desired maximum temperature; the temperature at which it is introduced into the reactor is as previously explained, determined by the minimum temperature required to initiate oxidation. Again, as earlier described, 90 to 95 percent of the coolant is discharged through valve 29 and line 30. In this case, however, it is found desirable to divert an additional amount of coolant through valve 25 and line 26 in order to maintain even higher temperatures in section 43 than would otherwise be obtained. To accomplish this purpose valve 25 is opened sufficiently so that an amount of coolant roughly equivalent to about 90 percent of that flowing through reactor section 42 is discharged. Accordingly, only about one-half to one percent of the coolant flow originally introduced into the reactor through line 28 is finally discharged through valve 33 and line 34. When the coolant flow is such as here described, the yield of pyromellitic anhydride obtained is appreciably higher than when the path of the coolant is that described in Example 1.

In all cases, of course, the coolant may be processed in known manner to recover heat therefrom and be subsequently recycled.

The invention has been described for reactors in which the flow of reactants is in a downward direction and in which the coolant flows in the same direction or co-currently. An equivalent modification of a counter-current coolant flow, as the latter is now employed, is possible. Thus, with the reactant flow as earlier described, counter-current coolant flow would require that the coolant, in the reactor described, be introduced through valve 33 and line 34. To obtain the advantages previously described, the amount of coolant so introduced need be only a minor proportion of the amount ultimately needed to maintain temperature control in the hot-spot zone higher in the reactor. In order to aid in maintaining temperature, additional amounts of coolant may either be added or removed through valves 25, 23, and 31. In any event, and assuming, that in this case, too, the hot spot zone lies in sections 41 and 40, the amount of coolant required to control hot-spot temperatures is finally added through valves 29 and, if desired, 21. All coolant, is, of course, discharged through valves 27 and 19.

Reactors of the type described are sometimes operated so that the reacting gases flow upwardly through the reactor. In such cases, too, coolant flow is preferred by some to be co-current and by others to be counter-current to the direction of the gas flow. In either case, the methods to be employed to obtain maximum cooling through the hot spot zone (which in a reactor in which the reactants flow upwardly will be in the lower half of the reactor) and reduced but controlled amounts of cooling in the remainder of the reactor will, mutatis mutandis, be readily evident to those skilled in the art from descriptions already detailed herein.

It is also possible, as may already be evident from what has been said, to alter the temperature of the relatively small volumes of temperature control fluid being added to the reactor at the various intermediate points by causing the fluid to pass through appropriately sized heat exchange units before passing into the reactor. The relatively small volume of fluid which requires heating or cooling makes such a possibility economically feasible. Thus, for example, in order to reduce the volume of coolant which must be circulated when the temperature thereof is no lower than the minimum initiation temperature of the oxidizing gas mixture, in the situation as described in Example 1, it is only necessary to add molten salt through valve 21 and line 22 which is at a temperature below the coolant added through line 28. Since the oxidation has already been well started by the time the gas passes through section 40 of the reactor and is proceeding exothermically with the evolution of large amounts of heat, it need no longer be feared that the addition of coolant through line 22 which is below the minimum initiation temperature of the reaction will prevent the oxidation from starting. The total flow of coolant required will, when this alternative is employed, be dependent on the temperature of the fluid added at line 22, but in any event, the sum of the amount added through lines 28 and 22 will be less than if all of the coolant had been added through line 28, provided only that the coolant added through line 22 is below the temperature of the minimum permissible through line 28. Similarly, if higher temperatures than can conveniently be maintained simply by reducing the flow of coolant are desired in the lower sections of the reactor, small amounts of the heat-transfer fluid heated in any suitable and known manner by means external to the reactor can be added at any of the intermediate points provided.

All of these highly flexible alternatives for controlling temperatures at various points in the reactor are possible without any modifications of the usual single stage reactor normally employed beyond that required by the addition of inlet-outlet ports and suitable valves at various points. Moreover, in general, little modification of heat transfer fluid circulation loops normally provided is necessary; however, as already indicated, the addition of relatively small exchanges for further altering the temperature of small amounts of the circulating fluid introduced at various points in the reactor may further increase the precision of control thus made available by this invention.

The means here described for increasing the precision and range of temperature control in simple single stage reactors used for carrying out exothermic reactions requiring that large amounts of heat be removed are, of course, independent of the absolute temperatures at which the reactors are used in given case, or, of the various ranges of temperatures needed in any given case. The modifications and operating methods disclosed will serve equally well for all kinds of reactions of the type recited. Moreover, it will be evident to those skilled in the art that with simple changes, immediately evident now that the broad methods for temperature control here disclosed have been described, the same reactor modifications and processing methods will be applicable to endothermic reactions which requires the addition of heat as the reaction proceeds.

This invention provides means for altering the hitherto fixed relationship between the amount (and temperature) of coolant in various zones of a single reactor so that differing requirements for coolant in the various zones can be satisfied.

In view of the foregoing disclosures, variations modifications thereof will be apparent to one skilled in the art, and it is intended to include within the invention all such variations and modifications except as do not come within the scope of the appended claim.

What is claimed is:

In a process for the oxidation of an organic compound in an elongated reaction zone wherein the reaction takes place predominately in a particular area of said reaction zone, thereby providing an area of relatively high temperature in said zone, and wherein the temperature of the reaction zone is controlled by circulating a liquid coolant around said reaction zone, the improvement which comprises: introducing all of said liquid coolant about said reaction zone upstream of said area; flowing all of said coolant about said area, thereby providing the maximum cooling effect about said area; continuing the flow of a minor portion of said coolant about the remaining reaction zone downstream of said area and withdrawing a major portion of said coolant downstream of said area; cooling said reaction zone downstream of and remote to said area by flowing said minor portion of coolant about said reaction zone downstream of and remote to said area, thereby avoiding overcooling by providing a relatively low cooling effect; withdrawing coolant from at least one point remote to and downstream of said area; combining said withdrawn portions of coolants; abstracting heat therefrom; and recycling said coolant.

References Cited by the Examiner
UNITED STATES PATENTS

| | | | |
|---|---|---|---|
| 1,812,341 | 6/1931 | Jaeger | 23—288.92 |
| 2,955,925 | 10/1960 | Parker | 23—288.92 |

NICHOLAS S. RIZZO, *Primary Examiner.*

IRVING MARCUS, WALTER A. MODANCE,
*Examiners.*